INVENTORS
ALEXANDER LESNEWICH
KARL E. DORSCHU
EUGENE D. MONTRONE

BY Edmund W Bopp

AGENT

INVENTORS
ALEXANDER LESNEWICH
KARL E. DORSCHU
EUGENE D. MONTRONE
BY
Edmund W Bopp AGENT

United States Patent Office 3,496,323
Patented Feb. 17, 1970

3,496,323
GAS SHIELDED ARC WELDING OF STEEL
Alexander Lesnewich, New Providence, R.I., and Karl E. Dorschu, Basking Ridge, and Eugene D. Montrone, Westfield, N.J., assignors to Air Reduction Company, Incorporated, New York, N.Y., a corporation of New York
Filed Dec. 20, 1965, Ser. No. 515,016
Int. Cl. B23k 9/16, 35/38, 9/00
U.S. Cl. 219—74                                4 Claims

ABSTRACT OF THE DISCLOSURE

A method of welding mild and low alloy steels wherein the dip transfer mode of metal transfer is used in a shielding gas mixture comprised of helium, argon and carbon dioxide. A first preferred mixture comprises these gases in proportion of 40% to 60% argon, 1% to 15% carbon dioxide and 1% to 15% remainder helium. A second preferred mixture comprises the proportions of 60% to 80% helium, 1% to 15% carbon dioxide, and the remainder argon.

---

This invention relates to improvements in gravity resistant electric arc welding of steel by a dip transfer process, and more particularly with reference to high yield strength and high impact resistant low alloy steels, and to optimum mixtures of gases for shielding the arc during the welding of such steels when dip transfer is employed.

To take fullest advantage of the high toughness that has been made available in properly designed high strength, high impact resistant weld metal for the consumable electrode method of welding using a shield of inert or substantially inert gases, particularly in fabricating hulls of ships and submarines, it must be practicable to deposit the weld metal in all positions of the seam, including vertical welding, overhead, etc., herein called out of position welding or gravity resistant welding. For these applications a dip transfer process is successful where the more common spray transfer method is not satisfactory.

The type of welding method commonly known as the dip transfer process is illustrated by the disclosures contained in U.S. Patent No. 2,886,696, issued May 12, 1959 to R. W. Tuthill and A. U. Welch and owned by the assignee herein. In such a method, metal is transferred from a consumable electrode to the work by a series of repetitive short circuits. The electrode is fed into the arc region at a substantially constant rate. The pool of molten metal oscillates under the electrode, the center of the pool periodically engulfing the electrode tip, causing the short circuit. Periodicity occurs due to the inertia produced by the inductance of the welding current circuit together with the power of the arc current to eventually break the short circuit, form an arc and force aside molten metal to form a depression in the molten pool beneath the electrode tip. Starting from the first instant of short circuit, the current through the associated circuit impedances rises until the arc is formed. The current then decreases through the associated circuit impedances, the force of the arc plasma at first being most strong and rapidly forming the depression. As the current decreases, the force of the arc decreases, the depression is gradually refilled and the surface of the pool rises until another short circuit occurs and the cycle repeats.

The pulsations usually occur at rates such as about 20 to 150 per second.

During the time the arc is on, a drop of molten metal forms on the tip of the electrode, but substantially no metal is transferred to the workpiece. When the short circuit occurs, the drop of molten metal touches the molten pool and leaves the electrode to mingle with the metal in the pool. Periodic deposition of metal upon the work thus occurs, under conditions which are found favorable for avoiding loss of metal under force of gravity, as from a vertical seam, an overhead seam, or the like. A more complete description of the type of metal transfer is disclosed in the aforementioned Tuthill et al. U.S. Patent No. 2,886,696. The disclosure of such welding process, as may be required for a complete understanding of the present invention is hereby incorporated by reference.

A dip transfer method of welding, as mentioned above, facilitates welding against gravity in that the molten metal is transferred from the electrode tip to the weld pool in a drop which clings to the electrode tip until contact is made with the weld pool whereupon the drop coalesces with the metal in the pool without being projected through space, being at all times under strong cohesive force, first bound to the electrode and then bound to the molten material in the pool.

Another important factor in reducing the effect of gravity upon the metal to be transferred is increased wetting power of the transferred metal whereby the latter is held the more strongly in place in the weld pool or upon any portion of the workpiece with which it comes into contact. The matter of wetting is particularly important in filling in a relatively wide V-groove between plates to be joined as in constructions of hulls of ships and submarines. These grooves are generally vertical so that metal must be deposited against gravity. This is usually accomplished by multiple passes of the welding electrode adding successive relatively small beads. On the first pass it is desirable to plug the bottom of the groove with the weld bead. If the wetting is sufficient, the weld metal will stick to the sides of the groove and form a meniscus which plugs the opening. No more metal is deposited than the bead will take without running out. On successive passes, the metal will wet the already solidified bead or beads below and add successive beads until the seam is complete.

It is known that the presence of a limited amount of oxygen in the shielding gas surrounding the arc improves the wetting property of the weld metal in proportion to the amount of oxygen. The oxygen may be added to the inert gases customarily used for arc shielding, either in the form of gaseous oxygen or as carbon dioxide. Too large a proportion of oxygen or of carbon dioxide, however, is objectionable in that oxidation of essential elements of the steel in the workpieces takes place, and also excessive slag is formed.

Argon is usually the least expensive inert gas available for arc shielding. However, the voltage gradient in the arc in the presence of pure argon is relatively low, resulting in low force in the arc plasma. Consequently a relatively low repetition rate of short circuits in the dip transfer process results, which causes instability in the system as well as reduced penetration. For these reasons, it is customary to add helium or carbon dioxide to the argon, which increases the voltage gradient in the arc. Because of the necessity to keep the carbon dioxide content of the shielding gas low, some helium is advantageous.

The applicants herein have made a survey of welding methods, various shielding gas mixtures and welding wires to find out which methods, shielding gas mixtures and welding wire compositions, or combinations thereof, give the best and most practical results for gravity resistant welding of steel.

The survey had two main objectives.

First, the influence of the specific composition of the shielding gas upon the heat transfer characteristics of the dip transfer welding porcess was investigated. This was feasible using plates of mild steel and welding wires of compatible composition, because the heat transfer characteristics of mild steel and of high yield strength high impact resistant low alloy steels are recognized as being substantially the same. The object was to obtain maximum penetration of the weld consistent with best operating characteristics for gravity resistant welding. It was desired to develop a process in which even the less skilled operator can quickly learn to obtain commercially satisfactory results. The success of such a process is enhanced by the addition of carbon dioxide to the shielding gas mixture. In general, the higher the proportion of carbon dioxide the better for this purpose. However, it is recognized that there are definite limits to the proportion of carbon dioxide that is permissible without detriment to the mechanical properties of the finished weld, particularly yield strength and toughness.

Second, therefore, the mechanical strength and toughness properties were measured for most acceptable weld conditions as established under the first objective of the survey, particularly as to those welds which showed good penetration with a minimum proportion of carbon dioxide in the shielding gas. For this purpose, it was of course necessary to make and test welds using plates of high yield strength high impact resistant low alloy steels and welding wires of compositions compatible with such steels. In general, it was found that welds made with shielding gas mixtures in certain preferred ranges relatively low in carbon dioxide showed satisfactory toughness, whereas other welds, though of substantially equal yield strength, were materially inferior in toughness.

In the first portion of the above-described survey, a large number of test welds were made by a dip transfer method of electric arc welding of mild steel plate, using a wide range of mixtures of helium, argon and carbon dioxide as shielding gas, and measuring in each case the extent of penetration of the weld. An unexpected and anomalous result was obtained, in that for a given constant value of penetration, as the percentage of helium in the gas mixture was increased relatively to the percentage of argon, the percentage of carbon dioxide required to attain constant penetration with the various mixtures for reasonable percentages of carbon dioxide (0% to 20%) first rose somewhat, then fell to a very low value, rose again, then fell to about the same low value, defining two regions of relatively low carbon dioxide content. This is significant because while, in general, penetration increases with the addition of carbon dioxide to a helium-argon mixture, it is known that excessive quantities of carbon dioxide reduce the toughness of weld deposits. Thus it is highly desirable to obtain the greatest advantage of increased penetration with the least disadvantage of reduced toughness.

Considering optimum welding characteristics including weld penetration, applicants' survey disclosed two ranges of optimum gas mixtures: (1) argon, 40% to 60%; carbon dioxide 1% to 15%; remainder helium; and (2) helium, 60% to 80%; carbon dioxide, 1% to 15%; remainder argon. Within these ranges, specific exemplary mixtures are designated herein.

As specified above, the first series of tests was made on mild steel. From metallurgical considerations it was evident that, while penetration measurements with mild steel would not give identical results as would penetration measurements with the high yield strength high impact resistant low alloy steels, full reliance could be placed in relative values of penetration observed with mild steel under varying conditions as an indication of the results which would be obtained with the above-mentioned low alloy steels.

While the use of oxygen rather than carbon dioxide as an additive in helium-argon mixtures for dip-transfer welding has been advocated in the past, we have found that mixtures of oxygen, helium and argon are definitely less satisfactory than mixtures of carbon dioxide, helium and argon.

In the second phase of the survey, a number of test welds were made with high yield strength high impact resistant low alloy steel, using compatible welding wires are preferred shielding gas mixtures, upon which test weld measurements were made of yield strength and toughness. Similar test welds and mechanical tests were made using a non-preferred shielding gas mixture for comparison.

Other objects, features and advantages will appear from the following more detailed description of illustrative embodiments of the invention which will now be given in conjunction with the accompanying drawings.

Figure 1:
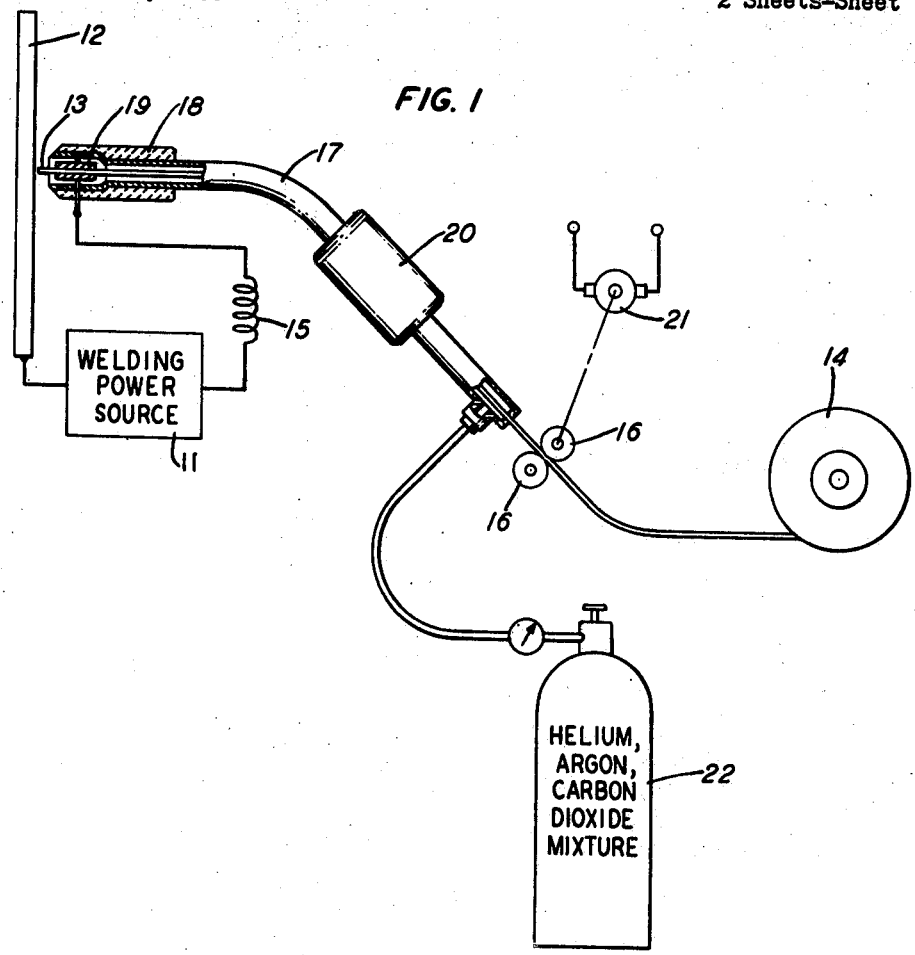
FIG. 1 is a schematic diagram of apparatus suitable for use in accordance with the invention.

FIGURE 1 shows one form of apparatus for carrying out the preferred process of the invention, wherein a wire electrode 13 is withdrawn from a reel 14, the wire being fed by a pair of motor-driven feed rolls 16 driven by a motor 21 shown diagrammatically as coupled to one of the rolls. The feed rolls 16 feed the wire electrode through a conduit 17 to a welding head 18. A hand grip 20 may be provided for holding the welding head in operative position with respect to the work, which latter is shown at 12 as a vertically disposed plate or plates. A gas cylinder 22 supplies a predetermined mixture of gases, selected in accordance with one feature of the invention, for shielding the arc, by way of the space between the casing of the conduit 17 and the wire 13 to the welding head 18. The gases may, of course, be supplied from separate sources and mixed as used by conventional metering and mixing devices.

A welding power source 11, is shown having one electrical terminal connected to the workpiece 12 and the other terminal connected to the wire 13 by way of an inductor 15 and a contact tube 19.

Alternatively, the welding apparatus for practicing the invention may be held and traversed relatively to the work in a machine in any suitable manner.

The welding current power source 11 is preferably a motor driven or engine driven rotating generator or a transformer-rectifier welder, although other sources of electrical energy may be used. The particular electrical characteristics of the power source are critical and it is also necessary that there be a certain amount of inductive reactance in the power supply and its associated circuit. Reactor 15 has been shown in the circuit of FIG. 1 to represent the inductance of the welding leads, etc., as well as any series inductance that may be added to the circuit. The power supply must have a relatively low open circuit voltage, in order that the arc may operate intermittently.

The operation of the system illustrated in FIG. 1 is substantially as described in the above cited Patent 2,886,696, and may be summarized as follows. Motor 21, preferably operated at constant speed, rotates feed rolls 16 which withdraw electrode wire 13 from the wire supply reel 14. As the wire leaves the feed rolls 16 it passes through the casing 17 and the welding gun 18.

Shielding gas from the supply cylinder 22 is fed at regulated pressure to the welding gun through the casing 17 where it discharges as an annular stream surrounding the end of the electrode 13 as the electrode emerges from the welding gun 18. The power supply provides an electrical potential between the end of the electrode 13 and the work 12 so that when the electrode 13 makes contact with the work 12 welding current flows in the circuit and an arc is established.

In the survey referred to above, the performance of specific gas compositions was appraised under standardized sets of welding conditions. Through subsequent comparative analysis the optimum gas mixtures were determined. All test welds were evaluated as to the following points for the reasons specified:

(1) Depth of penetration of the weld, to minimize the likelihood of insufficient fusion.

(2) Weld-bead contour, to aid in asuring complete fusion and to simplify conditions for multi-pass welding.

(3) Amount of spatter, to increase likelihood of operator acceptance, reduce the possibility of disturbing and/or restricting the flow of shielding gas, and to minimize the necessary amount of cleaning of the weld after solidification.

(4) Arc stability, to insure reliability of the welding process and to decrease the manipulative skill required.

(5) Sensitivity to variations of process parameters, to maintain consistency of results and to maintain control over the process under anticipated variations in the manipulative skill among the welders.

It will be understood that the above considerations were subjected to some degree of compromise in forming a judgment as to optimum compositions of shielding gas.

The test welds on mild steel were made using a mechanized set-up in which certain prescribed conditions were maintained. The welding gun was mounted on an adjustable carriage which was oscillated in a sine wave pattern in the horizontal plane at a rate of 40 oscillations per minute over an oscillation width of one-half inch. The work was moved relatively to the welding gun by means of a vertically oriented motorized carriage. The purpose of the horizontal oscilations was to simulate a typical operator weave pattern.

Test beads each ten inches long were deposited, each bead in a single pass, on a mild steel plate measuring 4 x 1½ x 20 inches.

The mass of the plate and its dimensions relative to the length of the test bead were such as to insure three-dimensonal cooling for the fusion zone at all energy input levels under steady-state deposition conditions. Examination of the test bead for penetration and quality was limited to sections taken from the center of the weld bead. These precautions were necessary in order to simulate actual welding conditions in workpiece plates of large area and ½ inch or more in thickness. It was adjudged that the heat sink provided in the test plate was equivalent to the heat sink present under the usual working set-up. In all cases the same low-alloy steel wire was used as the electrode. This wire is of the general type disclosed and claimed in Dorschu U.S. Patent 3,215,814 and because of its general physical characteristics and properties is classified in the welding industry at HY-140 wire.

The following paramteters were maintained constant throughout the tests: shielding gas flow, 50 cubic feet per hour; contact tube to work distance, ⅜ inch.

The pulsation rate and the electrode feed rate were found to depend upon the specification of the numerous process parameters involved with the dip-transfer welding method; e.g., current, voltage, shielding gas composition, electrode diameter, etc. Electrode wire diameters used in the tests ranged from 0.035 to 0.062 inch. Typical pulsation rates which resulted were observed to range from 20 to 150 pulses per second. Accompanying electrode feed rates were observed to range from one to six inches per second.

The welding current was maintained within a practical range consistent with the above parameters and conditions, between a minimum of about 120 amperes, that would yield satisfactory penetration of the weld in a final or "capping" pass, and a maximum of about 160 amperes, which an operator could handle with facility.

The power supply provided a rectified direct current output and permitted individually controlled variations of both the volt-ampere characteristic and the inductance. For the tests, a constant potential mode of operation and a high reactance were used.

Other types of power supply have been successfully in practicing the invention, including drooping voltage-current characteristic and rising voltage-current characteristic, and it is to be understoood that any power supply may be used consistent with the dip transfer mode of metal transfer.

Except for periodic replacement of contact tubes, the same equipment was used throughout the entire investigation.

During welding, the operation conditions were noted while current and voltage were recorded simultaneously on averaging meters and an oscillograph. The latter allowed easy measurement of other pertinent arc characteristics.

After welding, the bead appearance was evaluated and then the plates were sectioned, polished, and etched so that penetration measurements could be made on the prepared cross-sections by means of a shadowgraph.

Figure 2:
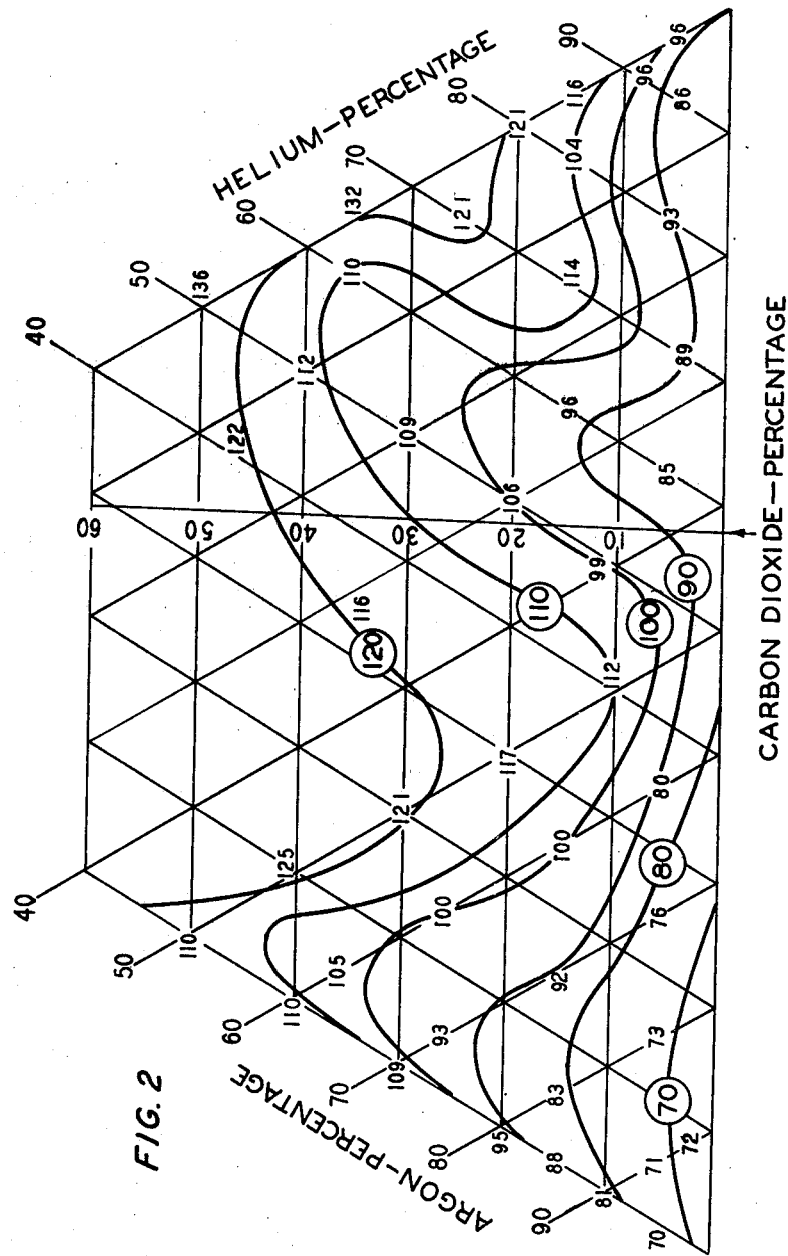
FIG. 2 is a graph in which weld penetration is plotted as a function of percentages of helium, argon and carbon dioxide in a ternary mixture of those gases.

In FIG. 2 three coordinate systems are superposed at angles of 60° to each other to depict the possible proportions of the three gases, argon, helium and carbon dioxide. Lines of equal helium content extend upward to the right, beginning with no helium at the extreme left of the graph and going by steps of 10% to 100% helium at the extreme lower right corner of the graph. Lines of equal argon content extend upward to the left, beginning with no argon at the extreme right of the graph and going by steps of 10% to 100% argon at the extreme lower left corner of the graph. Lines of equal carbon dioxide content are horizontal, beginning with no carbon dioxide at the bottom of the graph and going by steps of 10% carbon dioxide toward the top of the graph. Measurements of penetration of the weld are plotted in thousandths of an inch and approximate contour lines of equal penetration are shown for penetrations of 0.070 to 0.120 inch by steps of 0.010 inch.

FIGURE 2 summarizes the results obtained in the first phase of the survey. Viewing the tests as the incremental substitution of helium for argon in argon-carbon dioxide binary mixtures, penetration is seen from the graphs as decreasing, then recovering and subsequently increasing. This occurs at varying rates of change according to the level of carbon dioxide in the mixture. That is, as the level of carbon dioxide increases, the rates of change generally increase and the recovery point is reached at lower proportions of helium. This behavior is exemplified in the argon-rich portion of the figure.

On the other hand, viewing the tests as the incremental substitution of argon for helium in helium-carbon dioxide binary mixtures, a region of inflection of the penetration curves is found in the neighborhood of 70% helium. Both above and below this value, a decreased recovery pattern is observed but changes are of much greater magnitude in gas mixtures containing less than 70% helium, as may be seen from the figure.

The figure demonstrates that maximum penetration is not necessarily achieved by substituting increasing amounts of helium for argon while keeping carbon dioxide at a fixed level. For example, with 20% carbon dioxide in the shielding gas, a penetration of 0.095 inch was produced in a mixture with only argon; penetration 0.090 with 10% helium substituted for arogn; 0.100 with 20% helium; 0.115 for 30% helium; 0.100 for 50% helium; 0.115 for 70% helium.

The figure shows a tongue of high penetration to exist with about 50% argon and any combination of helium and carbon dioxide whose sum is 50%. Another tongue of high penetration is found with about 70% helium. On the other hand, a tongue of low penetration is found with about 60% helium.

Inspection of the figure indicates a region of high penetration with low carbon dioxide content which region can be defined as approximately 40 to 60% argon, 1 to 15% carbon dioxide, remainder helium. Another such region can be defined as approximately 60 to 80% helium, 1 to 15% carbon dioxide, remainder argon.

Evaluation of all consideratons has led to the following especially preferred mixtures:

In the argon 40% to 60% range:
    Argon 50%, carbon dioxide 10%, helum 40%
    Argon 50%, carbon dioxide 15% helium 35%
In the helium 60% to 80% range:
    Helium 70%, carbon dioxide 4%, argon 26%
    Helium 70%, carbon dioxide 10%, argon 20%
    Helium 70%, carbon dioxide 15%, argon 15%

Ternary mixtures of argon, helium and oxygen were compared with the mixtures of argon, helium and carbon dioxide. In attempting to deposit test beads with more than 5% oxygen in the shielding gas, it was found that excessive fluidity of the molten pool developed which prohibited satisfactory vertical welding. On the other hand, gases containing between 1 and 5% oxygen produced poor bead contours having relatively low penetration. In most cases the spatter was heavy and the feasible rate of short-circuiting the arc was undesirably low. In all cases, the results with oxygen were inferior to those obtained with comparable carbon dioxide mixtures.

A general conclusion from the investigation is that penetration increases with progressively higher carbon dioxide contents. The penetration increase was found to be accompanied by an increase in the optimum dip rate. Thus carbon dioxide occupies a unique position as a component in dip transfer shielding gases because greater penetration is achieved with a decrease in fluidity of the molten pool, enabling the lesser-skilled operator to manipulate the weld pool with considerable ease.

Another general conclusion is that the optimum mixtures result from the fact that the helium and carbon dioxide produced deep penetrations which can be utilized effectively when the arc is stabilized by the addition of argon.

As mentioned above, there is a practical limit to the proportion of carbon dioxide which can be utilized to obtain increased penetration. It is known that carbon dioxide tends to "burn out" oxidizable elements in steel such as manganese and silicon when added in too great amounts. Also, the use of excessive amounts of carbon dioxide tends to add carbon to the weld pool which tends to reduce the toughness of the weld metal. For reasons such as these, the preferred gas mixtures lie in the range from 1 to 15% carbon dioxide.

Figure 3:
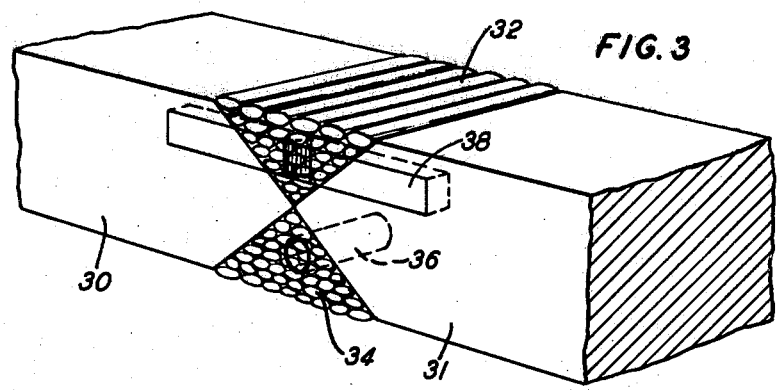
FIG. 3 is a cross-sectional perspective view of a weldment made in accordance with the invention.

To confirm the test results obtained with mild steel, a number of test welds were made in the form of double-V joints between 1 inch thick plates of HY–140 (5 Ni-Cr-Mo-V) high yield strength high impact resistant low alloy steel. These plates are in the 140,000 pounds per square inch class as to yield strength. FIGURE 3 shows a typical test weld joining plates 30 and 31. The weldments, each composed of multiple passes, are shown diagrammatically at 32 and 34.

In making these test welds, a preheat and interpass temperature of 200° F. was maintained, and the welding current and voltage were 135 ampers and 18 volts respectively, and the travel speed of the welding tool averaged about 4 inches per minute. The welding wire used was 0.045 inch in diameter, and varied in composition among six different varieties of welding wire used, as identified in Table I.

TABLE I

| Wire No. | Nominal composition in percent by weight | | | | | |
|---|---|---|---|---|---|---|
| | C | Mn | Ni | Cr | Mo | V |
| 9376 | 0.10 | 1.8 | 2 | 1.0 | 0.5 | |
| 5785A | 0.10 | 2.1 | 2 | 1.0 | 0.5 | |
| 5781A | 0.08 | 1.8 | 2 | 1.0 | 0.5 | |
| 5779B | 0.08 | 1.8 | 3 | 0.7 | 0.5 | 0.05 |
| 5787A | 0.10 | 1.8 | 3 | 1.0 | 0.5 | |
| 5782B | 0.08 | 1.8 | 4 | 0.5 | 0.5 | 0.05 |

Each of the above wires contained in addition to the above components shown in Table I, about 0.015% by weight of titanium. These wires as a group are designated AX–140 Welding Wires by Air Reduction Company, Incorporated, New York.

The preferred wires listed above are of the type disclosed and claimed in Dorschu U.S. Patent 3,215,814 dated Nov. 2, 1965, and owned by the assignee herein. Such wires are characterized by a composition in percentage by weight of carbon 0.05 to 0.11, manganese 1.40 to 2.36, silicon 0.29 to 0.49, nickel 1.56 to 3.00 chromium 0.12 to 1.61, molybdenum 0.38 to 0.60, copper up to 0.59, titanium 0.010 to 0.025, a minimum of phosphorus and sulfur, remainder essentially iron. Our tests have indicated that when a dip transfer process is used the range for nickel may be extended to about 4% and that carbox may range as high as 0.13%.

With each of the wires listed in Table I, test welds were made using various specific mixtures of shielding gases, as shown in Table II.

From each test weld, a tension test specimen 36 (FIG. 3) in the form of a 0.252 inch diameter rod of the weld metal was taken from the actual weld as deposited in the double V joint and solidifier in place. The specimens were subjected to tension tests in which measurements were made for each specimen, of yield strength in kips per square inch for a 0.2% offset, tensile strength in kips per square inch, elongation percent in 1 inch original length, and reduction of area of cross section of the specimen in percent. Also, Charpy V-notch impact tests were made of each test weld at three temperatures, namely 30° F., 0° F., and −60° F., measuring in each case the energy absorption in foot pounds. Specimens for the impact tests were taken from the test weld in the position shown diagrammatically at 38 in FIG. 3.

The principal test results are given in Table II.

TABLE II

| Wire No. | Shielding gas (percent) | | | Yield Str. | Tensile Str. | Energy Absorption | | |
|---|---|---|---|---|---|---|---|---|
| | A | He | CO₂ | | | +30° F. | 0° F. | −60° F. |
| 9376 | 50 | 40 | 10 | 142 | 159 | 68 | 71 | 58 |
| | 34 | 33 | 33 | 131 | 160 | 46 | 45 | 47 |
| 5785A | 26 | 70 | 4 | 145 | 157 | 72 | 68 | 60 |
| | 50 | 40 | 10 | 139 | 159 | 60 | 58 | 44 |
| | 15 | 70 | 15 | 132 | 161 | 60 | 59 | 47 |
| | 34 | 33 | 33 | 141 | 155 | 48 | 47 | 48 |
| 5781A | 26 | 70 | 4 | 137 | 158 | 73 | 74 | 70 |
| | 50 | 40 | 10 | 142 | 155 | 61 | 61 | 57 |
| 5779B | 26 | 70 | 4 | 139 | 159 | 68 | 65 | 60 |
| | 50 | 40 | 10 | 146 | 157 | 60 | 58 | 51 |
| 5787A | 26 | 70 | 4 | 139 | 160 | 59 | 55 | 45 |
| | 50 | 40 | 10 | 141 | 157 | 57 | 56 | 47 |
| 5782B | 26 | 70 | 4 | 145 | 157 | 60 | 55 | 40 |
| | 34 | 33 | 33 | 146 | 159 | 44 | 42 | 36 |

The data contained in Table II are shown rearranged in Table III to bring out the comparison between the toughness measurements as between the welds made with the preferred shielding gas mixtures and those made with a nonpreferred shielding gas mixture, namely substantially equal parts of argon, helium and carbon dioxide.

TABLE III

| Wire No. | Shielding gas (percent) | | | Yield Str. | Tensile Str. | Energy Absorption | | |
|---|---|---|---|---|---|---|---|---|
| | A | He | CO² | | | +30° F. | 0° F. | −60° F. |
| 5779B | 50 | 40 | 10 | 146 | 157 | 60 | 58 | 51 (P) |
| 5782B | 34 | 33 | 33 | 146 | 159 | 44 | 42 | 36 |
| 5785A | 26 | 70 | 4 | 145 | 157 | 72 | 68 | 60 (P) |
| 5782B | 26 | 70 | 4 | 145 | 157 | 60 | 55 | 40 (P) |
| 9376 | 50 | 40 | 10 | 142 | 159 | 68 | 71 | 58 (P) |
| 5781A | 50 | 40 | 10 | 142 | 155 | 61 | 61 | 57 (P) |
| 5787A | 50 | 40 | 10 | 141 | 157 | 57 | 56 | 47 (P) |
| 5785A | 34 | 33 | 33 | 141 | 155 | 48 | 47 | 42 |
| 5785A | 50 | 40 | 10 | 139 | 159 | 60 | 58 | 44 (P) |
| 5779B | 26 | 70 | 4 | 139 | 159 | 68 | 65 | 60 (P) |
| 5787A | 26 | 70 | 4 | 139 | 160 | 59 | 55 | 45 (P) |
| 5781A | 26 | 70 | 4 | 137 | 158 | 73 | 74 | 70 (P) |
| 5785A | 15 | 70 | 15 | 132 | 161 | 60 | 59 | 47 (P) |
| 9376 | 34 | 33 | 33 | 131 | 160 | 46 | 45 | 40 |

(P)=Preferred.

In Table III, the test results are arranged in descending order of yield strength. It will be noted that there is very little, if any, difference in yield strength between welds made with a preferred shielding gas mixture and the welds made with the non-preferred shielding gas mixture. There is a difference, however, in the results of the toughness tests. The table shows three groups of test results, wherein in each group the result for the non-preferred gas shows yield strength closely comparable to the yield strengths for the results with the preferred gases. In each of these groups, the toughness measurements corresponding to the use of the non-preferred gas mixture are materially lower than the toughness measurements corresponding to the use of the preferred gas mixtures. The table shows the following preferred gas mixtures:

Argon 50%, helium 40%, carbon dioxide 10%
Argon 26%, helium 70%, carbon dioxide 4%
Argon 15%, helium 70%, carbon dioxide 15%

It will be understood that the proportions of the shielding gas mixtures may be varied as desired within the ranges disclosed herein.

While illustrative embodiments of the invention have been described herein, it will be understood that numerous changes may be made without departing from the general principles and scope of the invention.

We claim:

1. A gravity resistant method for producing a high yield strength, high impact resistant low alloy steel weld which comprises impressing an electrical potential between a consumable low alloy steel electrode and the work to be welded in a circuit including a source of current and a predetermined value of inductive reactance, feeding said electrode toward said workpiece to cause said electrode to make electrical contact with said workpiece to initiate the flow of current in said circuit and thereafter form an arc between said electrode and said work, shielding the arc end of the electrode, the arc and the weld puddle formed by said arc with the shielding gas comprising a mixture of from about 1% to about 15% carbon dioxide, from about 60% to about 80% helium and the balance argon, and correlating the potential so impressed with the inductive reactance of the circuit and with the electrode feed rate to cause the arc to be unstable permitting the electrode to periodically contact the work and reinitiate the cycle at a repetition rate such that substantially no molten metal is transferred from the electrode to the work during the arcing period of the alternating cycle and the weld pool size and temperature are thereby maintained at such values as to prevent displacement of the molten metal prior to solidification.

2. A method according to claim 1 in which the low alloy steel electrode contains Mn, Ni, Cr and Mo in proportions to yield weld metal having a yield strength in excess of 130,000 p.s.i. and a V-notch Charpy toughness level in excess of 20 foot-pounds at −60° F.

3. A method according to claim 1 in which shielding gas includes approximately 74% helium and approximately 6% carbon dioxide.

4. A gravity resistant method for producing a weld in mild or low alloy steel which comprises impressing an electrical potential between a consumable steel electrode and the work to be welded in a circuit including a source of current and a predetermined value of inductive reactance, feeding said electrode toward said workpiece to cause said electrode to make electrical contact with said workpiece to initiate the flow of current in said circuit and thereafter form an arc between said electrode and said work, shielding the arc end of the electrode, the arc and the weld puddle formed by said arc with the shielding gas comprising a mixture of from about 1% to about 15% carbon dioxide, from about 60% to about 80% helium and the balance argon, and correlating the potential so impressed with the inductive reactance of the circuit and with the electrode feed rate to cause the arc to be unstable permitting the electrode to periodically contact the work and reinitiate the cycle at a repetition rate such that substantially no molten metal is transferred from the electrode to the work during the arcing period of the alternating cycle and the weld pool size and temperature are thereby maintained at such values as to prevent displacement of the molten metal prior to solidification.

References Cited

UNITED STATES PATENTS

| 2,504,868 | 4/1950 | Muller et al. | 219—130 |
| 2,753,427 | 7/1956 | Yenni et al. | 219—74 |
| 2,886,696 | 5/1959 | Tuthill et al. | 219—137 |

JOSEPH V. TRUHE, Primary Examiner

J. G. SMITH, Assistant Examiner

U.S. Cl. X.R.

219—130

UNITED STATES PATENT OFFICE
CERTIFICATE OF CORRECTION

Patent No. 3,496,323     Dated February 17, 1970

Inventor(s) Alexander Lesnewich, Karl E. Dorschu, Eugene D. Montrone

It is certified that error appears in the above-identified patent and that said Letters Patent are hereby corrected as shown below:

Column 4, line 15, the word "are" should be -and-
Column 5, line 18 the word "asuring" should be -assuring-
Column 5, line 62 the word "at" should be -as-
Column 6, line 12, after the word "been" insert the word -used-
Column 6, line 72, the word "arogn" should be -argon-
Column 8, line 10, the word "ampers" should be -amperes-
Column 8, line 35, after "3.00" insert a comma
Column 8, line 40 and 41, the word "carbox" should be -carbon-
Column 8, line 60, "test" should be -tests-
Column 8, below line 60 in TABLE II, 2nd line, "47" should be -40-
Column 8, below line 60 in TABLE II, 6th line, "48" should be -42-
Column 9, TABLE III, in the headings, "CO²" should be -$CO_2$-

SIGNED AND SEALED
SEP 8 - 1970

(SEAL)
Attest:

Edward M. Fletcher, Jr.
Attesting Officer

WILLIAM E. SCHUYLER, JR.
Commissioner of Patents